(12) United States Patent
Ni

(10) Patent No.: US 11,226,535 B2
(45) Date of Patent: Jan. 18, 2022

(54) BROADBAND RADIATION GENERATION IN HOLLOW-CORE FIBERS

(71) Applicant: ASML NETHERLANDS B.V., Veldhoven (NL)

(72) Inventor: Yongfeng Ni, Waalre (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 17/019,972

(22) Filed: Sep. 14, 2020

(65) Prior Publication Data

US 2021/0080803 A1 Mar. 18, 2021

(30) Foreign Application Priority Data

Sep. 18, 2019 (EP) .................................... 19198064
Oct. 9, 2019 (EP) .................................... 19202163

(51) Int. Cl.
*G02F 1/35* (2006.01)
*G02F 1/365* (2006.01)
*G02F 1/355* (2006.01)

(52) U.S. Cl.
CPC .......... *G02F 1/3501* (2013.01); *G02F 1/3536* (2013.01); *G02F 1/3551* (2013.01); *G02F 1/365* (2013.01); *G02F 2202/32* (2013.01)

(58) Field of Classification Search
CPC .... G02F 1/3501; G02F 1/3536; G02F 1/3551; G02F 1/365; G02F 2202/32
See application file for complete search history.

(56) References Cited

U.S. PATENT DOCUMENTS 6,952,253 B2 10/2005 Lof et al.
6,961,116 B2 11/2005 Den Boef et al.
7,265,364 B2 9/2007 Teunissen et al.
(Continued)

FOREIGN PATENT DOCUMENTS

CN 107045248 8/2017
EP 1628164 2/2006
(Continued)

OTHER PUBLICATIONS

Travers et al., "Ultrafast nonlinear optics in gas-filled hollow-core photonic crystal fibers," J. Opt. Soc. Am. B 28, A11-A26 (2011). (Year: 2011).*

(Continued)

*Primary Examiner* — Daniel Petkovsek
(74) *Attorney, Agent, or Firm* — Pillsbury Winthrop Shaw Pittman LLP

(57) ABSTRACT

Radiation source assemblies and methods for generating broadened radiation by spectral broadening. A radiation source assembly includes a pump source configured to emit modulated pump radiation at one or more wavelengths. The assembly further has an optical fiber configured to receive the modulated pump radiation emitted by the pump source, the optical fiber including a hollow core extending along at least part of a length of the fiber. The hollow core is configured to guide the received radiation during propagation through the fiber. The radiation emitted by the pump source includes first radiation at a pump wavelength, and the pump source is configured to modulate the first radiation for stimulating spectral broadening in the optical fiber.

20 Claims, 7 Drawing Sheets

(56) References Cited

U.S. PATENT DOCUMENTS

| | | | |
|---|---|---|---|
| 7,283,712 B2* | 10/2007 | Shaw | G02B 6/02328 |
| | | | 385/125 |
| 7,295,739 B2* | 11/2007 | Solarz | G01N 21/8806 |
| | | | 359/285 |
| 7,646,471 B2 | 1/2010 | Teunissen et al. | |
| 8,284,478 B2* | 10/2012 | Tempea | H01S 3/0057 |
| | | | 359/332 |
| 9,160,137 B1* | 10/2015 | Abdolvand | G02F 1/365 |
| 10,520,789 B2* | 12/2019 | Knappe | G02F 1/3551 |
| 2007/0296960 A1 | 12/2007 | Den Boef et al. | |
| 2008/0198380 A1 | 8/2008 | Straaijer et al. | |
| 2009/0168062 A1 | 7/2009 | Straaijer | |
| 2009/0195768 A1 | 8/2009 | Bijnen et al. | |
| 2010/0007863 A1 | 1/2010 | Jordanoska | |
| 2010/0233600 A1 | 9/2010 | Den Boef et al. | |
| 2010/0328655 A1 | 12/2010 | Den Boef | |
| 2011/0026032 A1 | 2/2011 | Den Boef et al. | |
| 2011/0032500 A1 | 2/2011 | Straaijer | |
| 2011/0102753 A1 | 5/2011 | Van De Kerkhof et al. | |
| 2011/0102793 A1 | 5/2011 | Straaijer | |
| 2011/0188020 A1 | 8/2011 | Den Boef | |
| 2011/0249244 A1 | 10/2011 | Leewis et al. | |
| 2012/0044470 A1 | 2/2012 | Smilde et al. | |
| 2012/0044495 A1 | 2/2012 | Straaijer | |
| 2012/0082410 A1 | 4/2012 | Peng et al. | |
| 2013/0162996 A1 | 6/2013 | Straaijer | |
| 2013/0308142 A1 | 11/2013 | Straaijer | |
| 2014/0050235 A1 | 2/2014 | Clowes et al. | |
| 2015/0261097 A1 | 9/2015 | Mathijssen et al. | |
| 2016/0161863 A1 | 6/2016 | Den Boef et al. | |
| 2016/0370717 A1 | 12/2016 | Den Boef et al. | |
| 2019/0302570 A1 | 10/2019 | Kumar et al. | |
| 2020/0166699 A1* | 5/2020 | Bauerschmidt | G02B 6/02328 |

FOREIGN PATENT DOCUMENTS

| | | |
|---|---|---|
| TW | 201809921 | 3/2018 |
| WO | 2011012624 | 2/2011 |
| WO | 2016102127 | 6/2016 |
| WO | 2017032454 | 3/2017 |
| WO | 2017211694 | 12/2017 |

OTHER PUBLICATIONS

International Search Report and Written Opinion issued in corresponding PCT Patent Application No. PCT/EP2020/074963, completed Oct. 26, 2020.

European Search Report issued in corresponding European Patent Application No. 19202163, dated Mar. 13, 2020.

Tao, Y. et al.: "High-power linearly-polarized supercontinuum generation from few-mode polarization-maintaining photonic crystal fiber", *18th International Conference on Optical Communications and Networks (ICOCN)*, Huangshan, China, IEEE, pp. 1-3 (Aug. 5, 2019).

Li, Y. et al.: "Supercontinuum generation by dual-pulse-pumping in photonic crystal fibers", *18th International Conference on Optical Communications and Networks (ICOCN)*, Huangshan, China, IEEE, pp. 1-3 (Aug. 5, 2019).

Ermolov, A. et al.: "Supercontinuum generation in the vacuum ultraviolet through dispersive-wave and soliton-plasma interaction in a noble-gas-filled hollow-core photonic crystal fiber", Phys. Rev. A, vol. 92, No. 3, 033821 (Sep. 14, 2015).

Eltaif, T.: "Broadband Enhancement of Optical Frequency Comb Using Cascaded Four-Wave Mixing in Photonic Crystal Fiber", Hindawi, Advances in OptoElectronics, vol. 2017, Article ID 1365072 (Jul. 12, 2017).

Taiwanese Office Action issued in corresponding Taiwanese Patent Application No. 109132011, dated Aug. 30, 2021.

\* cited by examiner

BROADBAND RADIATION GENERATION IN HOLLOW-CORE FIBERS

This application claims the benefit of priority of European patent application no. 19202163.2, filed Oct. 9, 2019, and of European patent application no. 19198064.8, filed Sep. 18, 2019, each of which is incorporated herein in its entirety.

FIELD

The present description relates to methods, assemblies, and apparatus for generating broadened radiation by spectral broadening. In specific exemplary arrangements, the description relates to stimulating spectral broadening of radiation inside a hollow core fiber.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-$k_1$ lithography may be used to process features with dimensions smaller than the classical resolution limit of a lithographic apparatus. In such process, the resolution formula may be expressed as $CD=k_1 \times \lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and $k_1$ is an empirical resolution factor. In general, the smaller $k_1$ the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

SUMMARY

In the field of lithography, many different measurement systems may be used to obtain information about a lithographically exposed pattern. Such measurement systems may use radiation to interrogate a lithographically patterned substrate, such as electromagnetic radiation. Due to the small dimensions of the patterned features, properties of the radiation used for inspecting and/or measuring a substrate may affect what kind of information is obtained as part of the measurement. One or more radiation properties that may affect the measurement results may for example include the size and/or shape of the radiation beam, intensity of the radiation, and/or the wavelength(s) of the radiation. The wavelength may for example affect the smallest feature that may be distinguished in a measurement. Different materials and/or features may also have wavelength dependent reactions (e.g. due to absorption, transmission, interference effects, etc.). As a result, it may be desirable to be able to provide high quality radiation at a plurality of wavelengths for inspecting a substrate. This may for example be achieved by providing broadband radiation.

According to an aspect of the disclosure, there is provided a radiation source assembly for generating broadband radiation by spectral broadening. The assembly comprises a pump source configured to emit modulated pump radiation at one or more wavelengths, and an optical fiber configured to receive the modulated pump radiation emitted by the pump source. The optical fiber comprises a hollow core extending along at least part of a length of the fiber, and the hollow core is configured to guide the received radiation during propagation through the fiber. The radiation emitted by the pump source comprises first radiation at a pump wavelength, and the pump source is configured to modulate the first radiation for stimulating spectral broadening in the optical fiber.

Optionally, the pump source may further comprise a first radiation source configured to generate the first radiation and/or a second radiation source configured to generate second radiation at a seed wavelength for modulating the first radiation.

Optionally, the first radiation and the second radiation may be mixed for modulating the first radiation to produce modulated pump radiation, by spatially overlapping at least a portion of the first radiation with at least a portion of the second radiation.

Optionally, mixing the first radiation and the second radiation may comprise coherently overlapping at least a portion of the first radiation with at least a portion of the second radiation.

Optionally, the seed wavelength and the pump wavelength may meet phase matching conditions for four-wave-mixing.

Optionally, the seed radiation may have an intensity not exceeding 1%, 2%, 5%, 10% or 15% of the intensity of the modulated pump radiation.

Optionally, the pump source may be configured to modulate the first radiation in the time domain.

Optionally, the first radiation source may be configured to emit a pulse of first radiation, and to modulate the pulse of first radiation when the first radiation is at an intensity above a threshold intensity.

Optionally, the hollow core of the optical fiber may contain a fluid for stimulating spectral broadening.

Optionally, the assembly may further comprise a reservoir for containing the fluid. The reservoir and the optical fiber may be configured to provide the fluid to the hollow core of the optical fiber.

Optionally, the fluid may comprise a gas mixture comprising a noble gas.

Optionally, the fluid may comprise a gas mixture comprising a molecular gas.

Optionally, the length of the optical fiber may be in a range from 10 cm to 40 cm.

Optionally, the optical fiber may be a photonic crystal fiber.

Optionally, the photonic crystal fiber may comprise a single ring of microstructures surrounding the hollow core of the optical fiber.

Optionally, the single ring structure may comprise a plurality of capillaries surrounding the hollow core.

Optionally, the hollow core may have a diameter in a range from 25 µm to 35 µm, or has a diameter of 30 µm.

Optionally, the broadband radiation may comprise supercontinuum radiation.

According to an aspect of the disclosure, there is provided a method of generating broadband radiation by spectral broadening. The method comprises emitting, by a pump source, modulated pump radiation at one or more wavelengths, the emitted modulated pump radiation comprising first radiation at a pump wavelength. The method further comprises modulating, by the pump source, the first radiation for stimulating spectral broadening in an optical fiber, and receiving, by the optical fiber, the modulated pump radiation emitted by the pump source. The optical fiber comprises a hollow core extending along at least part of a length of the fiber, and the hollow core is configured to guide the received radiation during propagation through the fiber.

Optionally, the method further comprises generating, by a first radiation source, the first radiation and/or generating, by a second radiation source, second radiation seed radiation at a seed wavelength for modulating the first radiation.

Optionally, the spectral broadening of the modulated pump radiation may comprise a four-wave mixing process.

According to an aspect of the disclosure, there is provided a metrology apparatus comprising the radiation source assembly as described herein.

According to an aspect of the disclosure, there is provide an inspection apparatus comprising the radiation source assembly as described herein.

According to an aspect of the disclosure, there is provided a lithographic apparatus comprising the radiation source assembly as described herein.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The term "reticle", "mask" or "patterning device" as employed in this text may be broadly interpreted as referring to a generic patterning device that can be used to endow an incoming radiation beam with a patterned cross-section, corresponding to a pattern that is to be created in a target portion of the substrate. The term "light valve" can also be used in this context. Besides the classic mask (transmissive or reflective, binary, phase-shifting, hybrid, etc.), examples of other such patterning devices include a programmable mirror array and a programmable LCD array.

Figure 1:
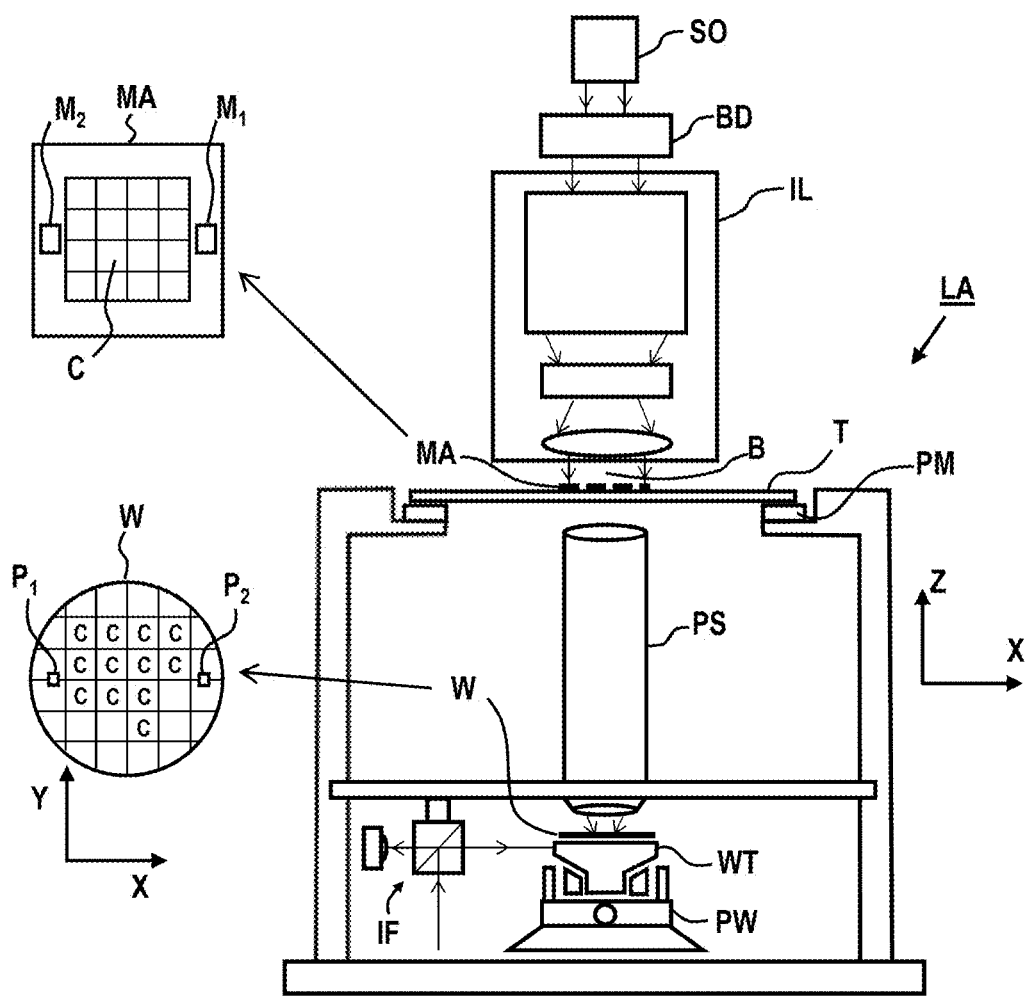
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a support (e.g., a mask table) T constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein in its entirety by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the support T, and is patterned by the pattern (design layout) present on patterning device MA. Having traversed the patterning device MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using patterning device alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
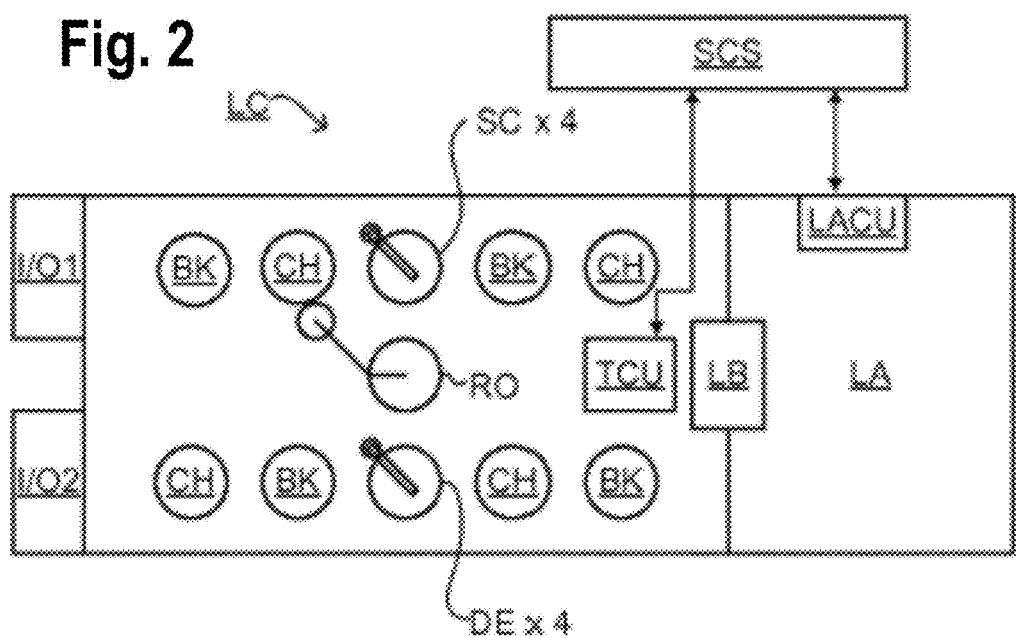
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, are typically under the control of a track control unit TCU that in itself may be controlled by a supervisory control system SCS, which may also control the lithographic apparatus LA, e.g. via lithography control unit LACU.

In order for the substrates W exposed by the lithographic apparatus LA to be exposed correctly and consistently, it is desirable to inspect substrates to measure one or more properties of patterned structures, such as overlay errors between subsequent layers, line thicknesses, critical dimensions (CD), etc. For this purpose, inspection tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine one or more properties of the substrates W, and in particular, how one or more properties of different substrates W vary or how one or more properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the one or more properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 3:
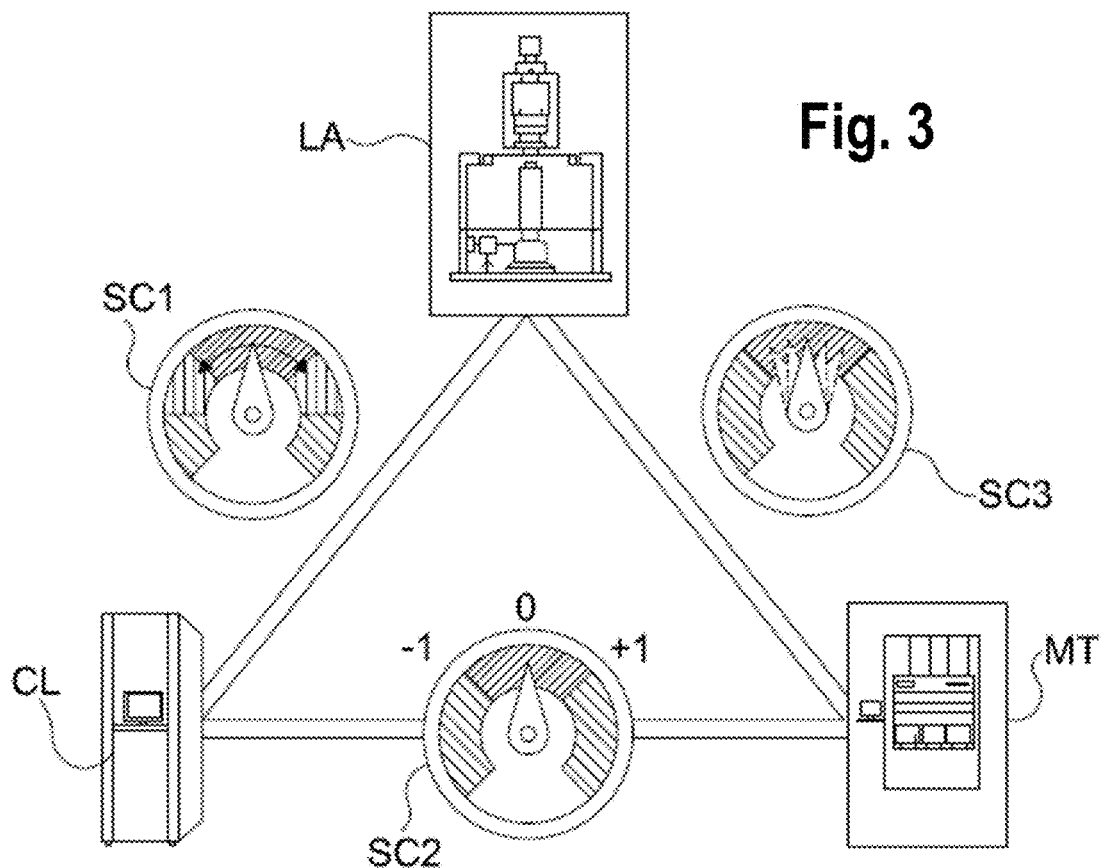
FIG. 3 depicts a schematic representation of holistic lithography, representing a cooperation between three technologies to optimize semiconductor manufacturing.

Typically the patterning process in a lithographic apparatus LA is one of the most critical steps in the processing which involves high accuracy of dimensioning and placement of structures on the substrate W. To help ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). An objective of such a "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—typically within which the process parameters in the lithographic process or patterning process are allowed to vary.

The computer system CL may use (part of) the design layout to be patterned to predict which resolution enhancement techniques to use and to perform computational lithography simulations and calculations to determine which patterning device layout and lithographic apparatus settings achieve the largest overall process window of the patterning process (depicted in FIG. 3 by the double arrow in the first scale SC1). Typically, the resolution enhancement techniques are arranged to match the patterning possibilities of the lithographic apparatus LA. The computer system CL may also be used to detect where within the process window the lithographic apparatus LA is currently operating (e.g. using input from the metrology tool MT) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

In lithographic processes, it is desirable to make frequently measurements of the structures created, e.g., for process control and verification. Tools to make such measurement are typically called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in U.S. patent application publication nos. US20100328655, US2011102753, US20120044470, US20110249244, US20110026032 and European patent application publication no. EP1,628,164, each of the foregoing patent application publications is incorporated herein in its entirety by reference. Aforementioned scatterometers may measure gratings using radiation from soft x-ray and visible to near-IR wavelength range.

In a first embodiment, the scatterometer MT is an angular resolved scatterometer. In such a scatterometer reconstruction methods may be applied to the measured signal to reconstruct or calculate one or more properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is an ellipsometric scatterometer. The ellipsometric scatterometer allows for determining one or more parameters of a lithographic process by measuring scattered radiation for each polarization state. Such a metrology apparatus emits polarized radiation (such as linear, circular, or elliptic) by using, for example, one or more appropriate polarization filters in the illumination section of the metrology apparatus. A source suitable for the metrology apparatus may provide polarized radiation as well. Various embodiments of existing ellipsometric scatterometers are described in U.S. patent application publication nos. 2007-0296960, 2008-0198380, 2009-0168062, 2010-0007863, 2011-0032500, 2011-0102793, 2011-0188020, 2012-0044495, 2013-0162996 and 2013-0308142, each of which is incorporated herein in its entirety by reference.

Examples of known scatterometers often rely on provision of dedicated metrology targets, such as underfilled targets (a target, in the form of a simple grating or overlapping gratings in different layers, that is large enough that a measurement beam generates a spot that is smaller than the grating) or overfilled targets (whereby the illumination spot partially or completely contains the target). Further, the use of metrology tools, for example an angular resolved scatterometer illuminating an underfilled target, such as a grating, allows the use of so-called reconstruction methods where the properties of the grating can be calculated by simulating interaction of scattered radiation with a mathematical model of the target structure and comparing the simulation results with those of a measurement. Parameters of the model are adjusted until the simulated interaction produces a diffraction pattern similar to that observed from the real target.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (typically overlapping) grating structures may be applied in two different layers (not necessarily consecutive layers), and may be formed substantially at the same position on the substrate. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or U.S. patent application publication no. US 20160161863, each of which is incorporated herein in its entirety by reference.

Other parameters of interest may be focus and dose. Focus and dose may be determined simultaneously by scatterometry (or alternatively by scanning electron microscopy) as described in U.S. patent application publication no. US 2011-0249244, incorporated herein in its entirety by reference. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and/or dose values may be uniquely determined from these measurements.

A metrology target may be an ensemble of composite gratings, formed by a lithographic process, mostly in resist, but also after etch process for example. Typically the pitch and line-width of the structures in the gratings strongly depend on the measurement optics (in particular the numerical aperture (NA) of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation, which are configured to mimic dimensions of the functional part of the design layout in a target. Due to this sub-segmentation, the targets will behave more similar to the functional part of the design layout such that the overall process parameter measurements resembles the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in U.S. patent application publication nos. US2016-0161863 and US 2016/03707171, each of which is incorporated herein in its entirety by reference.

Figure 4:
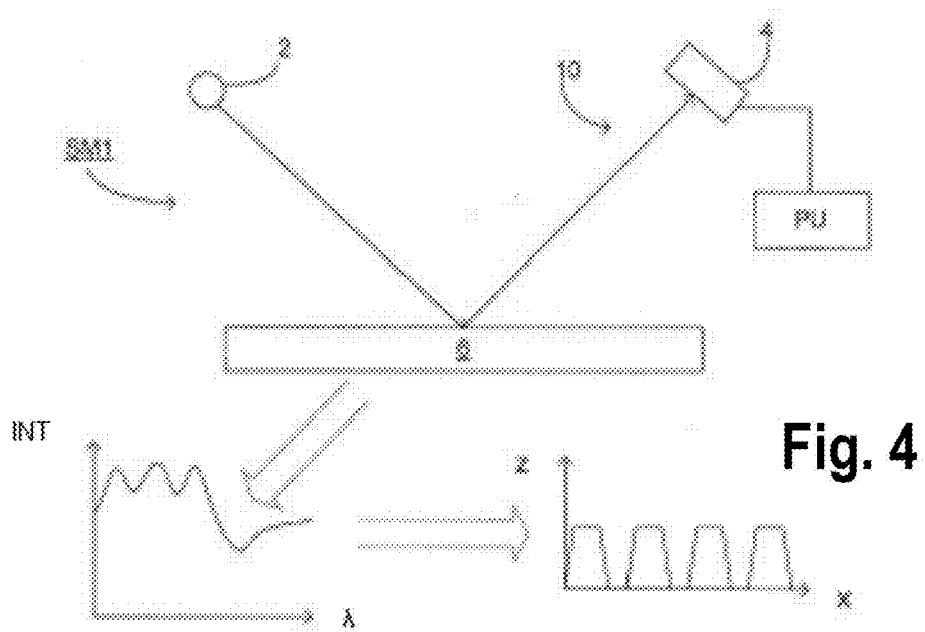
FIG. 4 depicts a schematic representation of a scatterometer.

A metrology apparatus, such as a scatterometer SM1, is depicted in FIG. 4. It comprises a broadband (white light) radiation projector 2 which projects radiation onto a substrate 6. The reflected or scattered radiation is passed to a spectrometer detector 4, which measures a spectrum 10 (i.e. a measurement of intensity INT as a function of wavelength λ) of the specular reflected radiation. From this data, the structure or profile giving rise to the detected spectrum may be reconstructed by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

A topography measurement system, level sensor or height sensor, and which may be integrated in the lithographic apparatus, is arranged to measure a topography of a top surface of a substrate (e.g., wafer). A map of the topography of the substrate, also referred to as height map, may be generated from these measurements indicating a height of the substrate as a function of the position on the substrate. This height map may subsequently be used to correct the position of the substrate during transfer of the pattern on the substrate, in order to provide an aerial image of the patterning device in a properly focus position on the substrate. It will be understood that "height" in this context refers to a dimension broadly out of the plane to the substrate (also referred to as Z-axis). Typically, the level or height sensor performs measurements at a fixed location (relative to its own optical system) and a relative movement between the substrate and the optical system of the level or height sensor results in height measurements at locations across the substrate.

Figure 5:
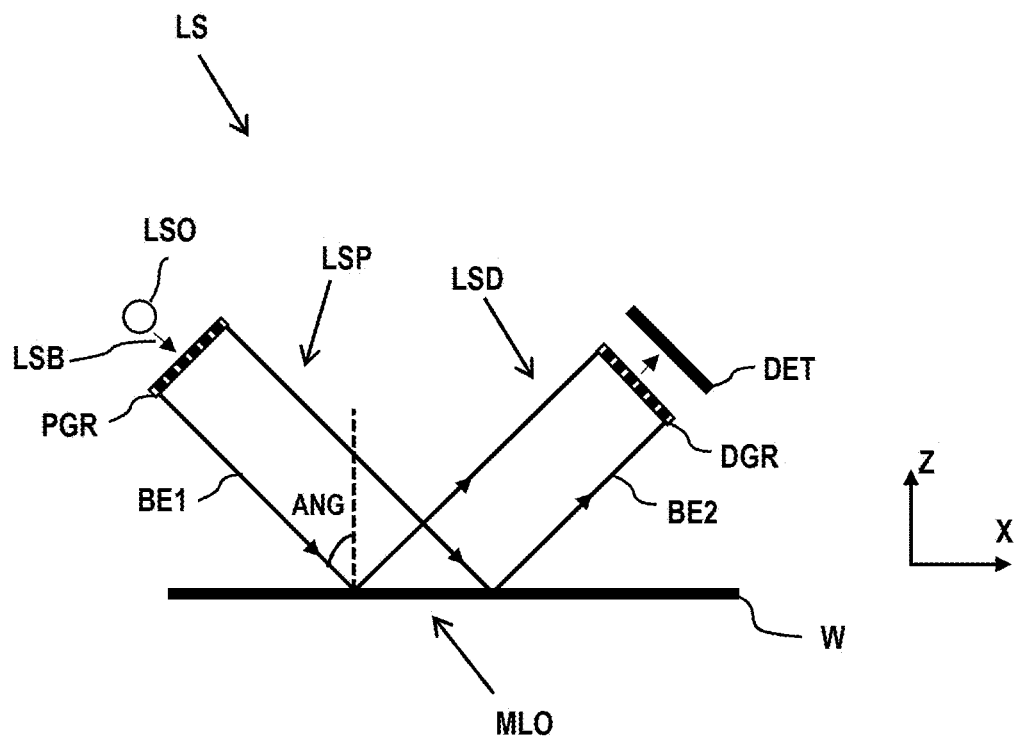
FIG. 5 depicts a schematic representation of a level sensor.

An example of a level or height sensor LS is schematically shown in FIG. 5, which illustrates only the principles of operation. In this example, the level sensor comprises an optical system, which includes a projection unit LSP and a detection unit LSD. The projection unit LSP comprises a radiation source LSO providing a beam of radiation LSB which is imparted by a projection grating PGR of the projection unit LSP. The radiation source LSO may be, for example, a narrowband or broadband radiation source, such as a supercontinuum radiation source, polarized or non-polarized, pulsed or continuous, such as a polarized or non-polarized laser beam. The radiation source LSO may include a plurality of radiation sources having different colors, or wavelength ranges, such as a plurality of LEDs. The radiation source LSO of the level sensor LS is not restricted to visible radiation, but may additionally or alternatively encompass UV and/or IR radiation and any range of wavelengths suitable to reflect from a surface of a substrate.

The projection grating PGR is a periodic grating comprising a periodic structure resulting in a beam of radiation BE1 having a periodically varying intensity. The beam of radiation BE1 with the periodically varying intensity is directed towards a measurement location MLO on a substrate W having an angle of incidence ANG with respect to an axis perpendicular (Z-axis) to the incident substrate surface between 0 degrees and 90 degrees, typically between 70 degrees and 80 degrees. At the measurement location MLO, the patterned beam of radiation BE1 is reflected by the substrate W (indicated by arrows BE2) and directed towards the detection unit LSD.

In order to determine the height level at the measurement location MLO, the level sensor further comprises a detection system comprising a detection grating DGR, a detector DET and a processing unit (not shown) for processing an output signal of the detector DET. The detection grating DGR may be identical to the projection grating PGR. The detector DET produces a detector output signal indicative of the radiation received, for example indicative of the intensity of the radiation received, such as a photodetector, or representative of a spatial distribution of the intensity received, such as a camera. The detector DET may comprise any combination of one or more detector types.

By means of triangulation techniques, the height level at the measurement location MLO can be determined. The detected height level is typically related to the signal strength as measured by the detector DET, the signal strength having a periodicity that depends, amongst others, on the design of the projection grating PGR and the (oblique) angle of incidence ANG.

The projection unit LSP and/or the detection unit LSD may include further optical elements, such as lenses and/or mirrors, along the path of the patterned beam of radiation between the projection grating PGR and the detection grating DGR (not shown).

In an embodiment, the detection grating DGR may be omitted, and the detector DET may be placed at the position where the detection grating DGR is located. Such a configuration provides a more direct detection of the image of the projection grating PGR.

In order to cover the surface of the substrate W effectively, a level sensor LS may be configured to project an array of measurement beams BE1 onto the surface of the substrate W, thereby generating an array of measurement areas MLO or spots covering a larger measurement range.

Various height sensors of a general type are disclosed for example in U.S. Pat. Nos. 7,265,364 and 7,646,471, each of which is incorporated herein in its entirety by reference. A height sensor using UV radiation instead of visible or infrared radiation is disclosed in U.S. patent application publication no. US2010233600, which is incorporated herein in its entirety by reference. In PCT patent application publication no. WO2016102127, which is incorporated herein in its entirety by reference, a compact height sensor is described which uses a multi-element detector to detect and recognize the position of a grating image, without needing a detection grating.

In the manufacture of complex devices, typically many lithographic patterning steps are performed, thereby forming functional features in successive layers on the substrate. A significant aspect of performance of the lithographic apparatus is therefore the ability to place the applied pattern correctly and accurately in relation to features laid down in previous layers (by the same apparatus or a different lithographic apparatus). For this purpose, the substrate is provided with one or more sets of marks. Each mark is a structure whose position can be measured at a later time using a position sensor, typically an optical position sensor. The position sensor may be referred to as "alignment sensor" and marks may be referred to as "alignment marks".

A lithographic apparatus may include one or more (e.g. a plurality of) alignment sensors by which positions of alignment marks provided on a substrate can be measured accurately. Alignment (or position) sensors may use optical phenomena such as diffraction and interference to obtain position information from alignment marks formed on the substrate. An example of an alignment sensor for a lithographic apparatus is based on a self-referencing interferometer as described in U.S. Pat. No. 6,961,116, which is incorporated herein in its entirety by reference. Various enhancements and modifications of the position sensor have been developed, for example as disclosed in U.S. patent application publication no. US 2015-261097, which is incorporated herein in its entirety by reference.

A mark, or alignment mark, may comprise a series of bars formed on or in a layer provided on the substrate or formed (directly) in the substrate. The bars may be regularly spaced and act as grating lines so that the mark can be regarded as a diffraction grating with a well-known spatial period (pitch). Depending on the orientation of these grating lines, a mark may be designed to allow measurement of a position along the X axis, or along the Y axis (which is oriented substantially perpendicular to the X axis). A mark comprising bars that are arranged at +45 degrees and/or −45 degrees with respect to both the X- and Y-axes allows for a combined X- and Y-measurement using techniques as described in U.S. patent application publication no. US2009/195768, which is incorporated herein in its entirety by reference.

The alignment sensor scans each mark optically with a spot of radiation to obtain a periodically varying signal, such as a sine wave. The phase of this signal is analyzed, to determine the position of the mark and, hence, of the substrate relative to the alignment sensor, which, in turn, is fixated relative to a reference frame of a lithographic apparatus. So-called coarse and fine marks may be provided, related to different (coarse and fine) mark dimensions, so that the alignment sensor can distinguish between different cycles of the periodic signal, as well as the exact position (phase) within a cycle. Marks of different pitches may also be used for this purpose.

Measuring the position of the marks may also provide information on a deformation of the substrate on which the marks are provided, for example in the form of a substrate grid. Deformation of the substrate may occur by, for example, electrostatic clamping of the substrate to the substrate table and/or heating of the substrate when the substrate is exposed to radiation.

Figure 6:
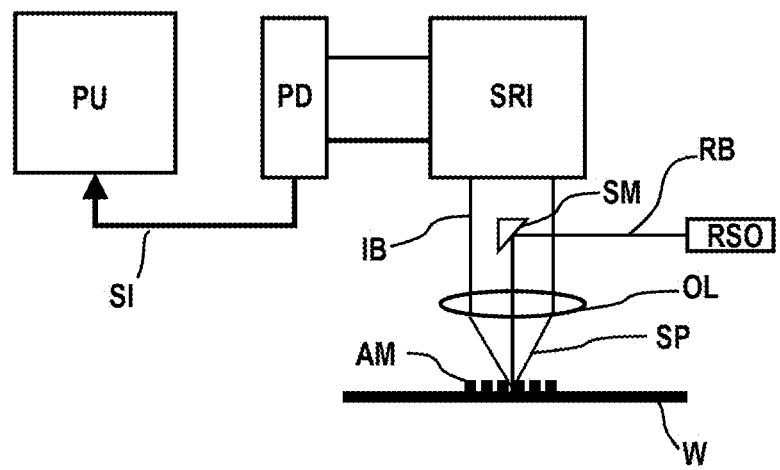
FIG. 6 depicts a schematic representation of an alignment sensor.

FIG. 6 is a schematic block diagram of an embodiment of an alignment sensor AS, such as is described, for example, in U.S. Pat. No. 6,961,116, which is incorporated herein in its entirety by reference. Radiation source RSO provides a beam RB of radiation of one or more wavelengths, which is diverted by diverting optics onto a mark, such as mark AM located on substrate W, as an illumination spot SP. In this example the diverting optics comprises a spot mirror SM and an objective lens OL. The illumination spot SP, by which the mark AM is illuminated, may be slightly smaller in width (e.g., diameter) than the width of the mark itself.

Radiation diffracted by the mark AM is collimated (in this example via the objective lens OL) into an information-carrying beam IB. The term "diffracted" is intended to include zero-order diffraction from the mark (which may be referred to as reflection). A self-referencing interferometer SRI, e.g. of the type disclosed in U.S. Pat. No. 6,961,116 mentioned above, interferes the beam IB with itself after which the beam is received by a photodetector PD. Additional optics (not shown) may be included to provide separate beams in case more than one wavelength is created by the radiation source RSO. The photodetector may be a single element, or it may comprise a number of pixels, if desired. The photodetector may comprise a sensor array.

The diverting optics, which in this example comprises the spot mirror SM, may also serve to block zero order radiation reflected from the mark, so that the information-carrying beam IB comprises only higher order diffracted radiation from the mark AM (this is not essential to the measurement, but improves signal to noise ratios).

Intensity signals SI are supplied to a processing unit PU. By a combination of optical processing in the block SRI and computational processing in the unit PU, values for X- and Y-position on the substrate relative to a reference frame are output.

A single measurement of the type illustrated only fixes the position of the mark within a certain range corresponding to one pitch of the mark. Coarser measurement techniques are typically used in conjunction with this to identify which period of a sine wave is the one containing the marked position. The same process at coarser and/or finer levels may be repeated at different wavelengths for increased accuracy and/or for robust detection of the mark irrespective of the materials from which the mark is made, and materials on and/or below which the mark is provided. The wavelengths may be multiplexed and de-multiplexed optically so as to be processed simultaneously, and/or they may be multiplexed by time division or frequency division.

In this example, the alignment sensor and spot SP remain stationary, while it is the substrate W that moves. The alignment sensor can thus be mounted rigidly and accurately to a reference frame, while effectively scanning the mark AM in a direction opposite to the direction of movement of substrate W. The substrate W is controlled in this movement by its mounting on a substrate support and a substrate positioning system controlling the movement of the substrate support. A substrate support position sensor (e.g. an interferometer) measures the position of the substrate support (not shown). In an embodiment, one or more (alignment) marks are provided on the substrate support. A measurement of the position of the marks provided on the substrate support allows the position of the substrate support as determined by the position sensor to be calibrated (e.g. relative to a frame to which the alignment system is connected). A measurement of the position of the alignment marks provided on the substrate allows the position of the substrate relative to the substrate support to be determined.

Metrology tools MT, such as the scatterometers, level sensors, and alignment sensors described above, may use radiation to perform measurements. The radiation may be electromagnetic radiation. The radiation may be optical radiation, for example comprising wavelengths in the infrared, visible, and/or ultraviolet parts of the electromagnetic spectrum. The radiation may comprise wavelengths in the extreme ultraviolet EUV (e.g. 1 nm to 100 nm), and or soft X-ray SXR (e.g. 0.1 nm to 10 nm) portions of the electromagnetic spectrum. The metrology tools MT may comprise or be connected to a radiation source. The type and quality of measurements performed by a metrology tool MT may be affected by the properties of the radiation used. Different types of radiation may be provided by different types of sources. Some sources may provide radiation at a single wavelength or in a small wavelength range. Other sources may be suitable for providing broadband radiation. The effects and techniques used for generating and providing radiation may be different for different types of radiation. For example, sources providing broadened radiation (such as broadband radiation) may use spectral broadening of narrowband or single wavelength radiation. In order to provide a radiation that provides high quality broadened radiation, it may be desirable to have a high level of control over the radiation output by the source. The increased control may allow one or more properties of the radiation to be controlled and set so that the quality and control of the resulting measurements may be improved. Described herein are methods and assemblies for providing an improved radiation source.

Broadened radiation may be generated using nonlinear processes. Nonlinear processes may require high radiation intensities to be stimulated efficiently. This may for example be achieved by coupling high intensity radiation into an optical fiber. Inside the fiber core, strong localized intensities of radiation may be obtained. The optical fiber may be a photonic crystal fiber, which may achieve strong confinement of radiation, for example within the fiber core. This may contribute to providing localized high intensities of radiation. Nonlinear processes may further require a nonlinear medium in which the nonlinear process may occur. This may for example be a nonlinear crystal, or a nonlinear fluid, for example a nonlinear gas or gas mixture. A nonlinear medium may be provided inside a fiber. The fiber may be a hollow-core fiber, for example a hollow-core photonic crystal fiber. A nonlinear medium, such as a nonlinear fluid, may be provided inside the hollow core. High intensity radiation may then be strongly confined within the hollow core of the optical fiber, allowing the high intensity radiation to interact with the nonlinear medium for generating broadened radiation.

Depending on the dispersion properties of a fiber and on the wavelength(s) provided in the fiber, different phenomena may contribute to the generation of broadened radiation. Examples of regimes in which broadened radiation generation may operate include self-phase-modulation (SPM) and/or modulation instability (MI). Both SPM and MI may for example occur in supercontinuum generation in a hollow-core fiber. Some spectral broadening processes, such as for example SPM, relate to the interaction of radiation with a nonlinear medium. Interaction of high intensity radiation with a nonlinear medium may cause the occurrence of nonlinear effects, for example broadening of a radiation pulse due to dispersion experienced because of the Kerr effect. It may lead to the spectral broadening of the radiation pulse. Other spectral broadening processes, for example modulation instability and/or four-wave mixing, may result from the effects of mixing two or more radiation wavelengths in a nonlinear medium. Broadening of a radiation wavelength range may result from deviations or modulations in a radiation pulse being reinforced through nonlinear Kerr effects. Modulation instability may lead to spectral broadening of the modulated radiation, contributing to generating, e.g., broadband radiation.

Modulation instability may lead to the generation of broadened radiation (e.g., broadband radiation). However, MI is a stochastic process. It may rely on noise causing a modulation of the received radiation to allow modulation instability to occur. The amount of spectral broadening caused by modulation instability after a certain amount of time, for example after a certain propagation distance through a fiber, may therefore be difficult to predict. This may make the process less reliable, which may require an increase in interaction time/propagation length to increase the probability the intended amount of spectral broadening has occurred. This may make the system inefficient.

Figure 7:
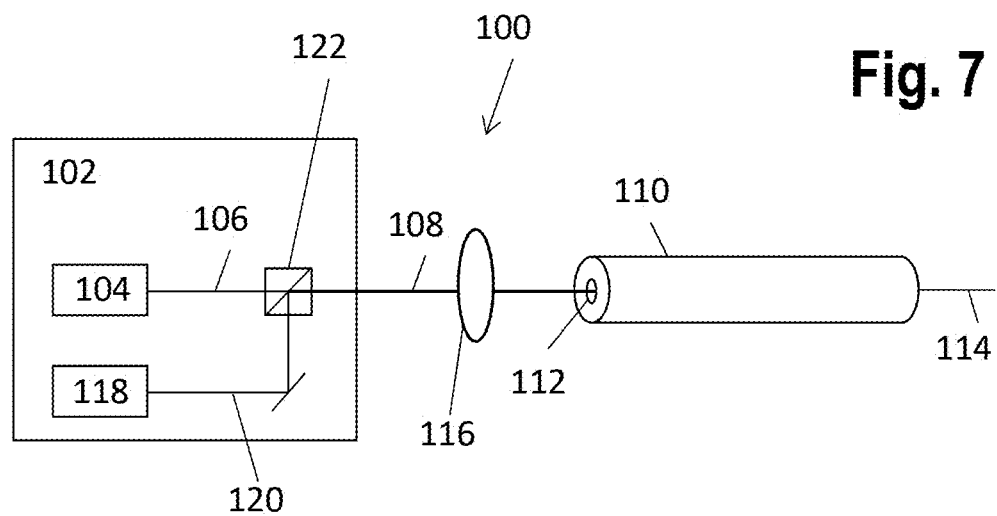
FIG. 7 depicts a schematic representation of a radiation source assembly for generating broadened radiation.

Described herein are assemblies, apparatuses, and methods for broadening received radiation by seeding a modulation instability process. FIG. 7 depicts a radiation source assembly 100 for generating broadband radiation by spectral broadening. The assembly comprises a pump source 102 configured to emit radiation at one or more wavelengths. The pump source 102 may comprise a first radiation source 104 configured to emit first radiation 106 at a pump wavelength. The pump wavelength may be referred to herein as a first wavelength, and the first radiation may be referred to as pump radiation.

The pump source 102 may be configured to modulate the first radiation 106 to form modulated pump radiation 108. The modulated pump radiation 108 may be output by the pump source 102. The modulated pump radiation 108 may be coupled into an optical fiber 110 comprising a hollow core 112 configured to guide radiation coupled into the fiber 110. The modulated pump radiation 108 coupled into the fiber 110 may propagate through the fiber 110. Inside the fiber 110, spectral broadening of the modulated pump radiation 108 to form broadened radiation 114 may occur. Radiation 114 may be coupled out of the fiber 110. The modulated nature of the modulated pump radiation 108 coupled into the fiber 110 may stimulate spectral broadening inside the optical fiber 110. The radiation source assembly 100 may further comprise an optical assembly 116 for coupling the modulated pump radiation 108 into fiber 110. The optical assembly 116 may, for example, comprise a focusing lens or focusing objective.

Figure 8:
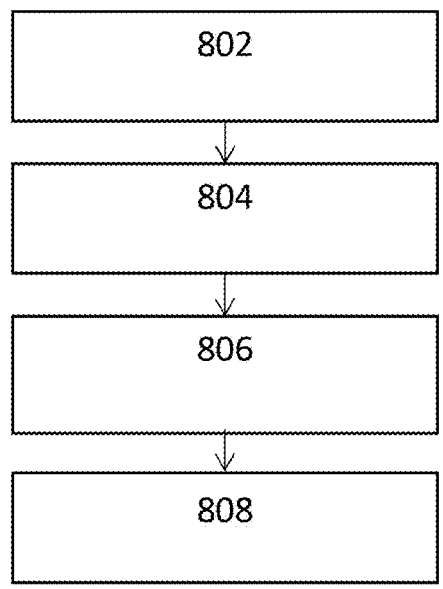
FIG. 8 depicts a flow diagram with steps in a method of generating broadened radiation through spectral broadening of modulated radiation.

FIG. 8 depicts a flow diagram with steps of a method of forming broadened radiation 114 through spectral broadening. In step 802, first radiation 106 is provided at one or more wavelengths to the pump source 102. The first radiation 106 may be provided by the first radiation source 104. In step 804, the first radiation is modulated by the pump source 102. The modulated pump radiation 108 is emitted from the pump source 102. In step 806, the modulated pump radiation 108 may be coupled into the optical fiber 110, which is a hollow core fiber, and is therefore received by the optical fiber 110. Inside the optical fiber 110, in step 808 of the method, the modulated pump radiation 108 is spectrally broadened to form radiation 114. This spectral broadening process may comprise modulation instability and/or four wave mixing (FWM) processes to generate additional wavelengths from the one or more wavelengths input to the fiber 110 from the source 102.

An advantage of providing modulated pump radiation 108 to optical fiber 110 for broadening a wavelength range, is that the radiation 114 may be generated faster and more reliably compared to broadened radiation generated using unmodulated pump radiation. This may be because the modulation on the first radiation 106 may act as a seed for the modulation instability process. Instead of relying on the stochastic introduction of noise to the first radiation 106 to start modulation instability, the modulation introduced to the first radiation may increase the likelihood and consistency of the start of the modulation instability process. This may increase the stability and/or predictability of the broadened radiation generation process. Compared to an implementation not using modulated pump radiation, the assemblies and methods described herein may reduce the interaction time/propagation length required for generating broadened radiation.

The pump source 102 may comprise a second radiation source 118 configured to generate second radiation 120 at a seed wavelength. The first radiation 106 and second radiation 120 may be mixed, which may cause modulation of the first radiation 106 to produce modulated pump radiation 108. The pump source 102 may comprise two radiation sources 104, 118 for generating radiation at the first and second wavelengths respectively. These two sources 104, 118 may for example be two separate laser sources. In exemplary arrangements, the pump source 102 may receive the first radiation 106 and second radiation 120 from external first and second radiation sources.

A first radiation source 104 may generate and/or provide the first radiation 106. The second radiation 120 may be generated and/or provided by a second source 118. The second radiation may comprise a second wavelength different from the first wavelength. The modulated pump radiation 108 output by the pump source 102 may comprise mostly radiation by the first radiation source 104, at the first wavelength also referred to as the pump wavelength. This may be because the intensity of the first radiation 106 output by the first radiation source 104 may be significantly greater than the intensity of the second radiation 120 output by the second radiation source 118. The second radiation 120 may have an intensity not exceeding 1%, 2%, 5%, 10%, or 15% of the intensity of the first radiation 106. When the first radiation 106 and second radiation 120 are mixed, the second radiation 120 may modulate at least a portion of the first radiation 106 in the time domain. This modulation may form a seed for stimulating modulation instability for spectral broadening.

As a result, the second radiation 120 may be referred to as seed radiation, the second wavelength may be referred to as a seed wavelength, and the second radiation source 118 may be referred to as a seed source. The seed radiation 120 may be a second harmonic of the first radiation 106. In this case, the second source 118 may provide an output formed through second harmonic generation of some of the first radiation 106. The second radiation 120 may also be obtained as self-phase modulated radiation obtained from the first radiation 106. In this case, the second source 118 may provide an environment to achieve self-phase modulation of the first radiation 106 and output the resulting second radiation 120. In the flow diagram of FIG. 8, an optional step could be included alongside step 802 of providing first radiation 106. The optional step may comprise providing second radiation 120 at a seed wavelength in the pump source 102. In step 804, the modulation of the first radiation 106 to obtain modulated pump radiation 108 may be obtained by mixing the first radiation 106 and second radiation 120.

Figure 9A:
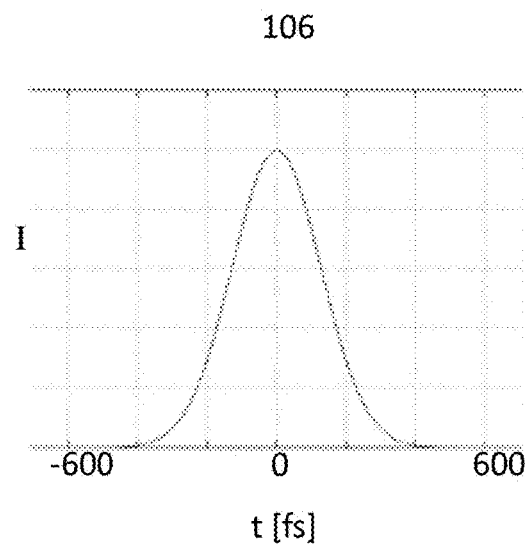
FIG. 9(a) depicts a graph of an envelope of a radiation pulse.
Figure 9B:
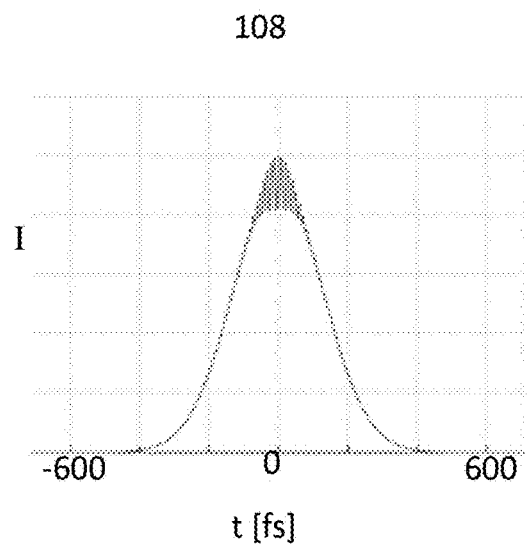
FIG. 9(b) depicts a graph of an envelope of a radiation pulse modulated in the time domain.

The first radiation 106 and the second radiation 120 may be mixed by spatially overlapping the first and second radiation. Mixing the first radiation 106 and the second radiation 120 may also comprise coherently overlapping the first radiation 106 and the second radiation 120. This may be achieved using optics 122, which may for example comprise a dichroic mirror. Overlapping the radiation of the two wavelengths may cause the radiation to interact when certain conditions are met. The conditions may for example relate to the phase relationship of the mixed first and second radiation. The conditions may impose requirements on the relation between the pump and seed wavelengths and the properties of the environment of the assembly 100 (e.g. refractive index of medium, fiber geometry, etc.). FIG. 9 depicts envelopes of radiation pulses in the time domain. FIG. 9(a) depicts a pulse of first radiation 106 generated by first source 104 before it is modulated. The envelope of the radiation represents the intensity of the pulse over time. The shape of the envelope may be substantially smooth. FIG. 9(b) depicts a modulated radiation pulse 108. At least a portion of the envelope of the pulse may have a modulated intensity. The pump source 102 may be configured to modulate the pump radiation 106 at intensities above a threshold intensity. In FIG. 9(b) the peak of the pulse envelope is illustrated to be modulated. This may be caused by the interaction of the pump radiation 106 with the seed radiation 120.

To understand which conditions may be met in order to stimulate modulation instability, it may be useful to consider the relationship between mixing of the pump radiation and the seed radiation in both the time domain and in the frequency domain. In the time domain, mixing high intensity pump radiation and low intensity seed radiation may result in a deviation of the smooth shape of the envelope of the pump radiation pulse in the time domain. This is modulation of the pump radiation as represented in the time domain. To understand how such a modulation may stimulate spectral broadening, and under what conditions, the frequency domain may provide a better picture. In the frequency domain, the spectral broadening resulting from modulation instability may be seen as a wave mixing process. The mixing of the pump radiation and the seed radiation may for example provide a trigger to a four-wave mixing process. Four-wave mixing (FWM) may rely on a third order nonlinearity. In FWM, a frequency f1 may mix and interact with a frequency f2 and generate further frequencies, for example f3 and f4, where the frequencies meet the condition $f1+f2=f3+f4$. FWM may for example also occur for frequencies wherein $2*f1=f3+f4$. Once more frequencies have been generated, these may phase match with yet other wavelengths, generating radiation at an increasing amount of wavelengths. This may result in the creation of broadened radiation generation. Other nonlinear processes may further contribute to the broadened radiation generation.

In order for the frequencies to be generated through a wave mixing process, phase matching conditions between the radiation frequencies may have to be met, or approximately met. The phase of radiation may depend on the frequency/wavelength of the radiation, as well as on the refractive index experienced by the radiation. Therefore, the dispersion properties of the environment in which the radiation is present in the assembly 100 may affect the phase matching conditions that may need to be met or approximately met. Specifically, the phase matching conditions may have to be met inside the hollow core fiber 110. As described herein, a pump wavelength and a seed wavelength that meet phase matching conditions inside fiber 110 may be mixed to achieve a wave mixing process for example a four wave mixing process.

If radiation at a seed wavelength and radiation at a pump wavelength are mixed, and they are phase matched inside the fiber 110, four wave mixing may be stimulated to achieve spectral broadening in the fiber. The FWM process may be stimulated by already having some radiation of phase matched frequencies present to start the wave mixing process. The mixed first and second radiation may for example be provided as modulated pump radiation 108 as described above. Mixing the radiation at a seed wavelength and the pump wavelength may stimulate the FWM process, which may speed up the time at which the process starts and occurs. This stimulation of a wave mixing process may increase the stability and the conversion efficiency of the process. This may in turn reduce the time needed to achieve spectral broadening of radiation to form radiation 114.

The phase matching condition may be met exactly for stimulating a four wave mixing process. This may for example be achieved by tuning the seed wavelength so that the pump and seed frequencies are phase matched. A tunable seed source may be provided in assembly 100 for this purpose. However, the process may also be successful for frequencies that approach but do not fully meet the FWM phase matching conditions. An advantage of a frequency combination approximately meeting a phase matching condition may be that no precise tuning is required as an approximate match also leads to spectral broadening. A tunable seed source may not be required, which may keep costs of the assembly 100 down. Another advantage of approximating a phase matching condition may be that radiation may be provided at convenient wavelengths, for example at a wavelength for which a radiation source is readily available. Examples of wavelengths provided by readily available sources include wavelengths of 1550 nm, 1030 nm, and wavelengths in the range of 700-800 nm. The spectral broadening may be more efficient and/or faster if the phase matching condition is met more closely. In an example implementation, a pump wavelength of 1030 nm may be used. The combination of 1030 nm pump radiation with seed radiation of example wavelengths of 1550 nm, 1200 nm, and 750 nm may all result in stimulated spectral broadening, compared to an implementation without seed radiation. However, if the seed wavelength is too close to the pump wavelength (e.g. a pump wavelength of 1030 nm and a seed wavelength of 1064 nm), the effect of the seed radiation may be limited. The relation between the pump wavelength and the seed wavelength may be tuned to optimize the effectiveness of stimulating modulation instability, and resulting spectral broadening.

Spectral broadening may rely on nonlinear processes. High radiation intensities may be required to obtain efficiency for nonlinear processes. In order to achieve high radiation intensities of the modulated pump radiation 108, the modulated pump radiation 108 may be coupled into a fiber 110. The fiber 110 may confine the radiation inside a small volume, creating localized high intensities. At least a part of the modulated pump radiation 108 coupled into the hollow-core fiber 110 may be confined inside the hollow core 112 of the optical fiber 110. In some instances, at least 80% of radiation coupled into the optical fiber may be confined inside the hollow core. In some instances, at least 85% of the radiation coupled into the optical fiber may be confined into the hollow core. In some instances, substantially all of the radiation coupled into the optical fiber may be confined inside the hollow core.

The hollow core 112 of fiber 110 may comprise a fluid for enabling and/or causing spectral broadening when the radiation interacts with the fluid. The fluid may be a nonlinear medium. The fluid may be a gas. The gas may be a pure gas or a gas mixture. The mixture may comprise hydrogen ($H_2$). The gas mixture may comprise a noble gas (e.g. Ar, He, Kr, Xe, Ne). The gas may comprise a molecular gas (e.g. $N_2$). The fiber 110 may be positioned inside a resealable reservoir, which may be suitable for containing the fluid. The reservoir may for example have one or more gas supplies for providing and controlling the gas mixture inside the hollow core 112 of the fiber 110.

The hollow core 112 of fiber 110 may result in a fiber 110 with a flat dispersion curve, for example compared to a solid-core fiber. An advantage of having a flat dispersion curve may be that the phase matching condition may be approximated for a wider range of wavelengths, compared to a setup having a greater variation in dispersion. This may be because wavelength-dependent refractive index values for an optical fiber affect the phase matching condition. If the refractive index has a similar value for a larger range of wavelengths around a wavelength satisfying the phase matching condition, it means that this larger wavelength range may approximate the phase matching condition. This may result in a wider and/or more effectively generated range of wavelengths, for example using four wave mixing.

Figures 10A, 10B:
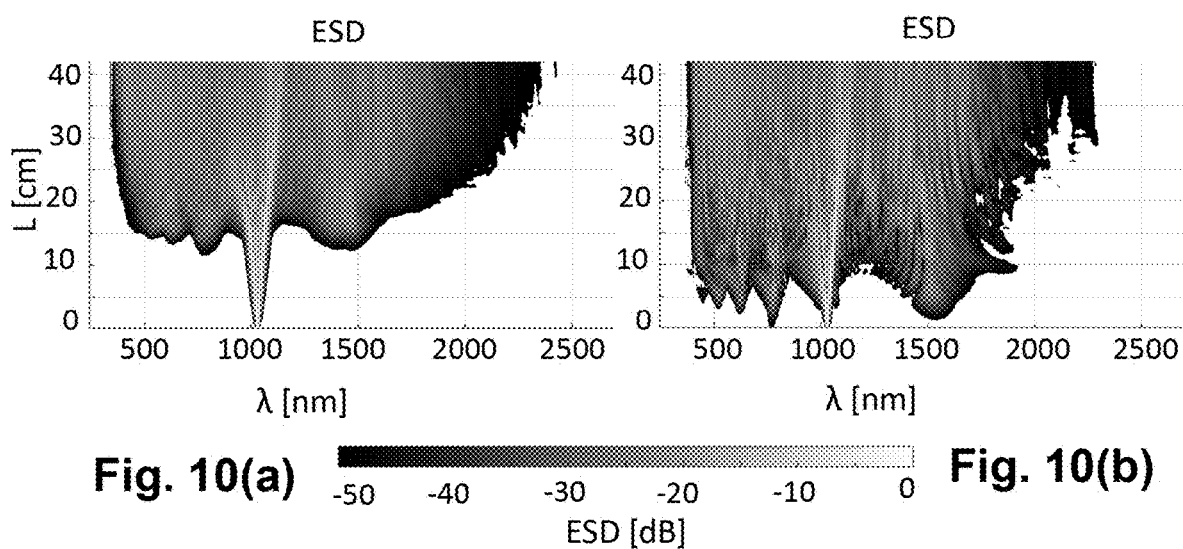
FIG. 10(a) depicts a graph showing spectral broadening as a function of propagation length without modulated pump radiation.
FIG. 10(b) depicts a graph showing spectral broadening as a function of propagation length of modulated pump radiation.

The length of fiber 110 required to obtain spectral broadening may be determined by the amount of interaction time/interaction length required by the modulated pump radiation 108 to spectrally broaden to form radiation 114. FIG. 10 depicts graphs of generated radiation wavelengths A as a function of position L along the length of a hollow core fiber 110. The grayscale depicts the energy spectral density ESD in decibels dB. By stimulating modulation instability through modulation of the modulated pump radiation 108 coupled into fiber 110, the length required may be reduced. FIG. 10(a) depicts a graph for spectral broadening without providing modulated radiation. For this implementation, the length of fiber 110 required to obtain broadened radiation over a range of interest (e.g. 400 nm to 2000 nm) may be 40 cm or more. As can be seen for the graph of FIG. 10(a), a longer propagation length is needed before spectral broadening extends over a wider wavelength range. At propagation length of about 12 cm of propagation length along fiber 110, the amount of broadening achieved in the non-modulated implementation is limited to a slow broadening of wavelengths on either side of the pump wavelength. After that propagation length, spectral broadening to a broadband range begins, due to modulation instability/four wave mixing. The skilled person will understand that the propagation length before modulation instability broadening occurs may be stochastic, and is not limited to 12 cm. In FIG. 10(b), spectral broadening covers a wider range of wavelengths from a shorter propagation length. Several side bands of the pump radiation are generated and broadened simultaneously from an earlier point along fiber 110. By providing first radiation 106 modulated by phase matched second radiation 120, the length of fiber 110 may be reduced below 40 cm. the length may for example be 10 cm. The length of fiber 110 in assembly 100 may be up to 10 cm; up to 20 cm; up to 30 cm; up to 40 cm; or in the range from 10 cm to 40 cm. The seed wavelength provided to the assembly 100 may be tuned for example to reduce the propagation length needed for broadened radiation generation.

Figure 11:
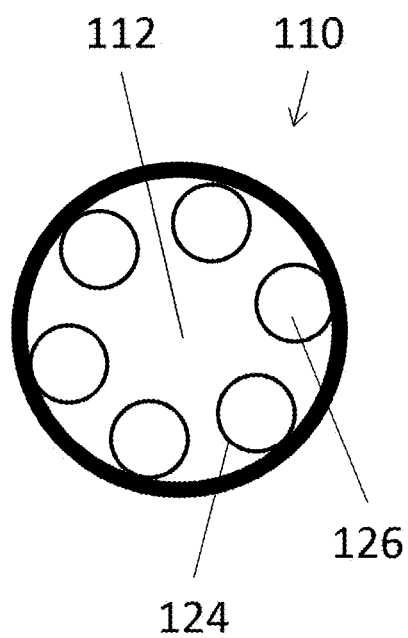
FIG. 11 depicts a schematic representation of a cross-section of a hollow core photonic crystal fiber.

The optical fiber 110 may be a photonic crystal fiber. An advantage of using a photonic crystal fiber may be that it may achieve strong confinement of radiation inside the hollow core. This may contribute to achieving high radiation intensities for increasing the efficiency of the nonlinear spectral broadening processes. The photonic crystal fiber may comprise a plurality of microstructures forming a photonic crystal for confining radiation to the hollow core 112 of fiber 110. A fiber 110 has an elongate dimension along which radiation is intended to propagate. A cross-section of the fiber perpendicular to this elongate dimension may comprise a distribution of microstructures surrounding the hollow core. This distribution may form the photonic crystal structure for guiding and confining radiation. The distribution in this cross-section may be substantially constant along the elongate dimension of the fiber 110. FIG. 11 depicts a schematic representation of a cross-section of a hollow core fiber 110 comprising a plurality of microstructures 124. The microstructures may comprise a single ring of capillaries 124 surrounding the hollow core 112 of the fiber 110. The capillaries may themselves have a hollow core 126. The capillaries 124 may be spatially separate, so that the edges of neighboring microstructures do not contact each other. The capillaries may be referred to as anti-resonant elements (AREs). The hollow core 112 of fiber 110 may have a cross-sectional width (e.g., diameter) in the range from 25 μm to 35 μm. The hollow core 112 may for example have a cross-section width of 30 μm. More information on hollow core photonic crystal fibers 110 for use in assembly 100 may be found in PCT patent application publication no. WO2017/032454, which is incorporated herein in its entirety by reference.

The radiation 114 generated by the source assembly 100 may comprise supercontinuum radiation. The supercontinuum radiation may comprise a radiation over continuous range of wavelengths. The broadband radiation may comprise radiation in the range of 400 nm to 2000 nm. The supercontinuum radiation may comprise a continuous range of wavelengths at least in the range of 400 nm to 2000 nm. Supercontinuum output radiation may comprise for example electromagnetic output radiation over a wavelength range of 100 nm-4000 nm. A broadband output radiation range may be for example 400 nm-900 nm, 500 nm-900 nm, or 200 nm-2000 nm or any range selected within 200 nm-2000 nm. The supercontinuum output radiation may comprise white light.

Further embodiments are disclosed in the subsequent numbered clauses:

1. A radiation source assembly for generating broadband radiation by spectral broadening, the assembly comprising:
    a pump source configured to emit modulated pump radiation at one or more wavelengths;
    an optical fiber configured to receive the modulated pump radiation emitted by the pump source, and comprising a hollow core extending along at least part of a length of the fiber, the hollow core being configured to guide the received radiation during propagation through the fiber,
    wherein the radiation emitted by the pump source comprises first radiation at a pump wavelength, and wherein the pump source is configured to modulate the first radiation for stimulating spectral broadening in the optical fiber.

2. An assembly according to clause 1, wherein the pump source further comprises a first radiation source configured to generate the first radiation and/or a second radiation source configured to generate second radiation at a seed wavelength for modulating the first radiation.

3. An assembly according to clause 2, wherein the first radiation and the second radiation are mixed for modulating the first radiation to produce modulated pump radiation, by spatially overlapping at least a portion of the first radiation with at least a portion of the second radiation.

4. An assembly according to clause 3, wherein mixing the first radiation and the second radiation comprises coherently overlapping at least a portion of the first radiation with at least a portion of the second radiation.

5. An assembly according to any of clauses 2 to 4, wherein the seed wavelength and the pump wavelength meet phase matching conditions for four-wave-mixing.

6. An assembly according to any of clauses 2 to 5, wherein the seed radiation has an intensity not exceeding 1%, 2%, 5%, 10% or 15% of the intensity of the modulated pump radiation.

7. An assembly according to any of clauses 1 to 6, wherein the pump source is configured to modulate the first radiation in the time domain.

8. An assembly according to clause 7, wherein the first radiation source is configured to emit a pulse of first radiation, and to modulate the pulse of first radiation when the first radiation is at an intensity above a threshold intensity.

9. An assembly according to any of clauses 1 to 8, wherein the hollow core of the optical fiber contains a fluid for stimulating spectral broadening.

10. An assembly according to clause 9, further comprising a reservoir for containing the fluid, the reservoir and the optical fiber being configured to provide the fluid to the hollow core of the optical fiber.

11. An assembly according to clause 9 or clause 10, wherein the fluid comprises a gas mixture comprising a noble gas.

12. An assembly according to clause 9 or clause 10, wherein the fluid comprises a gas mixture comprising a molecular gas.

13. An assembly according to any of clauses 1 to 12, wherein the length of the optical fiber is in a range from 10 cm to 40 cm.

14. An assembly according to any of clauses 1 to 13, wherein the optical fiber is a photonic crystal fiber.

15. An assembly according to clause 14, wherein the photonic crystal fiber comprises a single ring of microstructures surrounding the hollow core of the optical fiber.

16. An assembly according to clause 15, wherein the single ring structure comprises a plurality of capillaries surrounding the hollow core.

17. An assembly according to any of clauses 1 to 16, wherein the hollow core has a diameter in a range from 25 μm to 35 μm, or has a diameter of 30 μm.

18. An assembly according to any of clauses 1 to 17, wherein the broadband radiation comprises supercontinuum radiation.

19. A method of generating broadband radiation by spectral broadening, the method comprising
    emitting, by a pump source, modulated pump radiation at one or more wavelengths, the emitted modulated pump radiation comprising first radiation at a pump wavelength;
    modulating, by the pump source, the first radiation for stimulating spectral broadening in an optical fiber; and
    receiving, by the optical fiber, the modulated pump radiation emitted by the pump source, the optical fiber comprising a hollow core extending along at least part of a length of the fiber, the hollow core being configured to guide the received radiation during propagation through the fiber.

20. A method according to clause 19, further comprising generating, by a first radiation source, the first radiation and/or generating, by a second radiation source, second radiation at a seed wavelength for modulating the first radiation.

21. A method according to clause 20, wherein the spectral broadening of the modulated pump radiation comprises a four-wave mixing process.

22. A metrology apparatus comprising the radiation source assembly of any of clauses 1 to 18.

23. An inspection apparatus comprising the radiation source assembly of any of clauses 1 to 18.

24. A lithographic apparatus comprising the radiation source assembly of any of clauses 1 to 18.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

An embodiment may take the form of a computer program containing one or more sequences of machine-readable instructions describing a method as disclosed herein, or a computer-readable/data storage medium (e.g. semiconductor memory, magnetic or optical disk) having such a computer program stored therein. Further, the machine readable instruction may be embodied in two or more computer programs. The two or more computer programs may be stored on one or more memories and/or data storage media.

Although specific reference may be made in this text to embodiments of the invention in the context of a lithographic apparatus, embodiments of the invention may be used in other apparatus. Embodiments of the invention may form part of a patterning device inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

Although specific reference is made to "metrology apparatus/tool/system" or "inspection apparatus/tool/system", these terms may refer to the same or similar types of tools, apparatuses or systems. For example, the inspection or metrology apparatus that comprises an embodiment of the invention may be used to determine one or more characteristics of structures on a substrate (e.g., a wafer). For example, the inspection apparatus or metrology apparatus that comprises an embodiment of the invention may be used to detect defects of a substrate or defects of structures on a substrate. In such an embodiment, a characteristic of interest of the structure on the substrate may relate to defects in the structure, the absence of a specific part of the structure, or the presence of an unwanted structure on the substrate.

The invention claimed is:

1. A radiation source assembly for generating broadened radiation by spectral broadening, the assembly comprising:
a pump source configured to emit modulated pump radiation at one or more wavelengths; and
an optical fiber configured to receive the modulated pump radiation emitted by the pump source, and comprising a hollow core extending along at least part of a length of the fiber, the hollow core configured to guide the received radiation during propagation through the fiber,
wherein the radiation emitted by the pump source comprises pulsed first radiation at a pump wavelength, and wherein the pump source is configured to modulate pulses of the first radiation, in accordance with variations of a signal separate from the first radiation, for stimulating spectral broadening in the optical fiber.

2. The assembly according to claim 1, further comprising a radiation source configured to generate the first radiation and/or a radiation source configured to generate the signal in the form of second radiation at a seed wavelength for modulating the first radiation.

3. The assembly according to claim 2, wherein the pump source comprises the first and second radiation sources and wherein the first radiation and the second radiation are mixed for modulating the first radiation to produce modulated pump radiation, by spatially overlapping at least a portion of the first radiation with at least a portion of the second radiation.

4. The assembly according to claim 3, wherein mixing the first radiation and the second radiation comprises coherently overlapping at least a portion of the first radiation with at least a portion of the second radiation.

5. The assembly according to claim 2, wherein the pump source comprises the first and second radiation sources and wherein the seed wavelength and the pump wavelength meet phase matching conditions for four-wave-mixing.

6. The assembly according to claim 2, wherein the second radiation has an intensity not exceeding 15% of the intensity of the modulated pump radiation.

7. The assembly according to claim 1, wherein the pump source is configured to modulate the first radiation in the time domain.

8. The assembly according to claim 1, wherein the pump source is configured to modulate pulses of the first radiation when the first radiation is at an intensity above a threshold intensity.

9. The assembly according to claim 1, wherein the hollow core of the optical fiber is configured to contain a fluid for stimulating spectral broadening.

10. The assembly according to claim 9, wherein the fluid comprises a gas mixture comprising a noble gas or a gas mixture comprising a molecular gas.

11. The assembly according to claim 1, wherein the length of the optical fiber is in a range from 10 cm to 40 cm.

12. The assembly according to claim 1, wherein the optical fiber is a photonic crystal fiber.

13. The assembly according to claim 12, wherein the photonic crystal fiber comprises a single ring of microstructures surrounding the hollow core of the optical fiber.

14. The assembly according to claim 1, wherein the hollow core has a cross-sectional width in a range from 25 µm to 35 µm.

15. A metrology apparatus comprising the radiation source assembly of claim 1.

16. A lithographic apparatus comprising the radiation source assembly of claim 1.

17. A method of generating broadband radiation by spectral broadening, the method comprising:
- emitting, by a pump source, modulated pump radiation at one or more wavelengths, the emitted modulated pump radiation comprising pulsed first radiation at a pump wavelength;
- modulating, by the pump source, pulses of the first radiation, in accordance with variations of a signal separate from the first radiation, for stimulating spectral broadening in an optical fiber; and
- receiving, by the optical fiber, the modulated pump radiation emitted by the pump source, the optical fiber comprising a hollow core extending along at least part of a length of the fiber, the hollow core being configured to guide the received radiation during propagation through the fiber.

18. The method according to claim 17, further comprising generating second radiation at a seed wavelength for modulating the first radiation.

19. The method according to claim 18, wherein the spectral broadening of the modulated pump radiation comprises a four-wave mixing process.

20. The method according to claim 18, wherein the second radiation has an intensity not exceeding 15% of the intensity of the modulated pump radiation.

* * * * *